United States Patent [19]
Chang et al.

[11] Patent Number: 4,790,867
[45] Date of Patent: Dec. 13, 1988

[54] COOLING SYSTEM FOR GLASS MOLDING EQUIPMENT

[75] Inventors: Zung-Sing Chang; Jackson P. Trentelman, both of Painted Post, N.Y.

[73] Assignee: Corning Glass Works, Corning, N.Y.

[21] Appl. No.: 15,993

[22] Filed: Feb. 18, 1987

[51] Int. Cl.[4] .................. C03B 9/38; C03B 11/12
[52] U.S. Cl. ........................... 65/356; 65/355
[58] Field of Search .................. 65/83, 355, 356, 362

[56] References Cited
U.S. PATENT DOCUMENTS

| | | | |
|---|---|---|---|
| 3,171,731 | 3/1965 | Barger et al. | 65/356 |
| 3,202,498 | 8/1965 | Torok | 65/362 |
| 3,258,324 | 6/1966 | Torok | 65/362 |
| 3,761,220 | 9/1973 | Dirne | 65/356 |
| 3,849,101 | 11/1974 | Wythe et al. | 65/356 |
| 3,997,318 | 12/1976 | Takatoki et al. | 65/356 |
| 4,094,657 | 6/1978 | Carmi et al. | 65/356 |
| 4,140,512 | 2/1979 | Carmi et al. | 65/356 |

Primary Examiner—David L. Lacey
Assistant Examiner—Michael K. Boyer
Attorney, Agent, or Firm—Burton R. Turner

[57] ABSTRACT

Method and apparatus is set forth for cooling glass molding equipment such that the thermal considerations of the equipment design and the mechanical considerations thereof are uncoupled. The uncoupling of the thermal and mechanical considerations facilitates the utilization of the forming member at varying production speeds, since different cooling inserts, having the desired thermal characteristics for the particular production speed utilized, may be provided within the forming member. In order to effect good heat transfer between the forming member and the cooling insert, a gap is provided which is substantially filled with a low melting metal alloy.

7 Claims, 1 Drawing Sheet

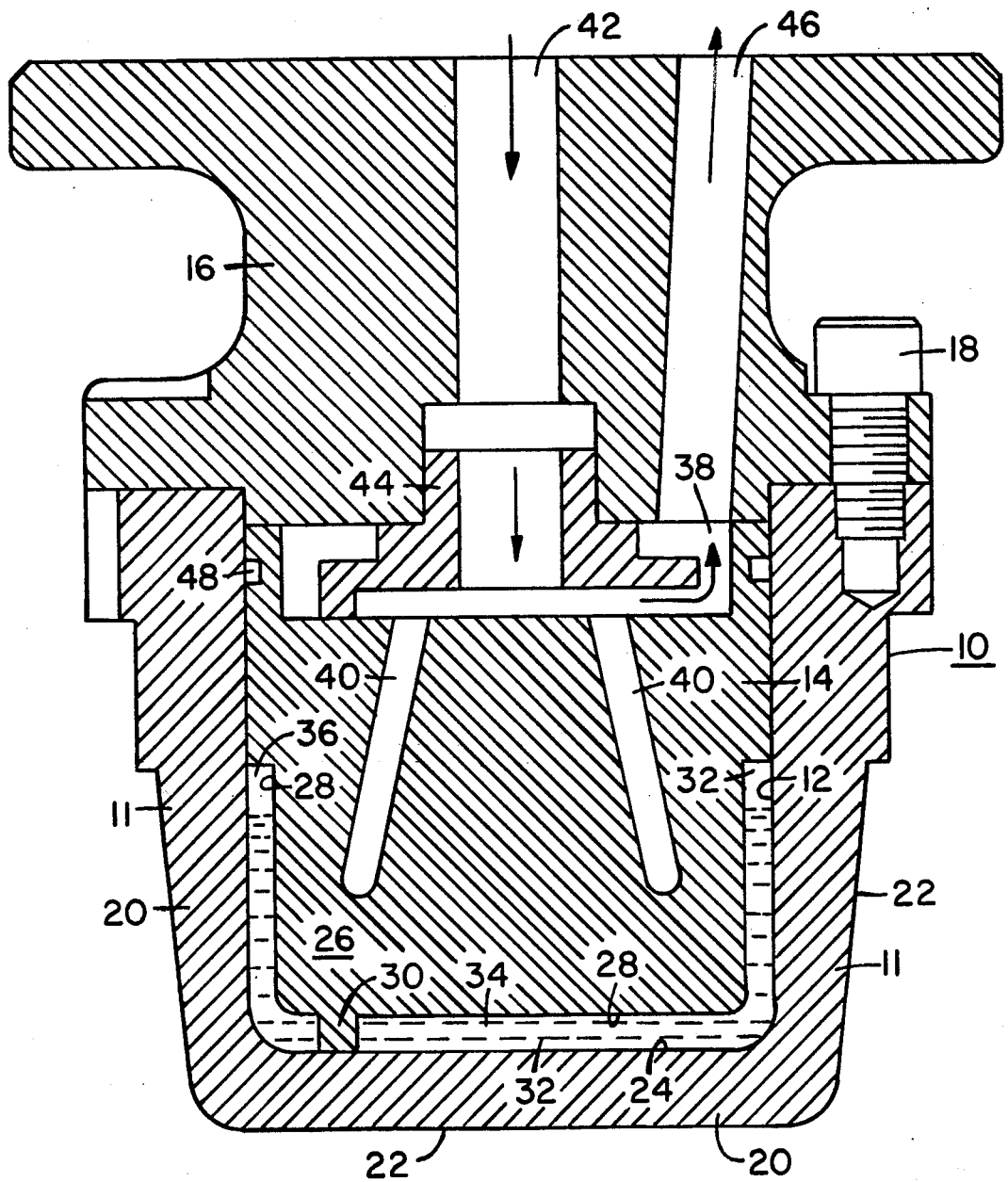

COOLING SYSTEM FOR GLASS MOLDING EQUIPMENT

BACKGROUND OF THE INVENTION

This invention relates to mold equipment utilized in glass making. More specifically, the invention relates to a cooling system for use in molds, plungers and even mold rings utilized in the press-forming of glass into articles. In addition, the invention relates to both method and apparatus for altering the temperature of the mold equipment, and hence the ability to remove heat from such equipment over a wide range of production speeds.

In the pressing of glass articles from molten or semi-molten glass, the rapid and controlled exchange of heat between the glass and the mold equipment is extremely important. It is particularly important that the temperature of the mold equipment be kept within a range that is most advantageous for the pressing process. Such temperature range is limited by operational constraints, in that the range should not exceed the temperature at which the glass begins to stick or adhere to the mold equipment, or should such range be less than the temperature at which optical defects or checks are produced in the product. The temperature range limitation materially restricts the range of production speeds which conventional mold equipment may operate, since the known cooling systems forming a part thereof are engineered for a particular predetermined production speed, and thus to be operable, such equipment had to be utilized within a limited operating speed range of about 2-3.

The problem of maintaining the mold equipment within a limited temperature range during various production speeds is aggravated by differential rates of heat removal from the mold equipment depending upon the geometry of the article being formed. In the pressing of glass, the rate of heat removal from the molten glass by the mold equipment depends to a large extent on the glass thickness and its geometric shape in localized regions. If the glass article to be produced has regions of both broad flat or slightly curved surfaces and also regions of relatively sharp corners, the rate of heat exchange between the glass and the mold equipment can differ significantly between such regions. Accordingly, the cooling systems of the prior art were designed specifically, not only for predetermined production speeds, but also for the differential heat removal necessary adjacent the various areas at such predetermined production speed. Thus, in such conventional mold equipment both the thermal and the mechanical considerations of the equipment had to be incorporated into the design. In other words, the mechanical and thermal considerations were by necessity coupled together, which further limited the versatility of such equipment.

Examples of the coupled cooling systems of the prior art are set forth in U.S. Pat. Nos. 3,202,498; 3,258,324; and 4,094,657. Both U.S. Pat No. 3,202,498 and U.S. Pat No. 4,094,657 are concerned with the problems encountered in uniformly removing heat during the pressing of glass articles having substantial variations in geometric shape and thickness. That is, specific cooling systems had to be designed for each plunger which included specifically positioned cooling jets and/or cooling grooves and insulated portions formed within the body of the plunger per se. Thus, both the mechanical and the thermal design considerations of such plungers were integrally coupled together. U.S. Pat. No. 3,258,324 patent also incorporated specially designed jets within a cooling system and thermal conductors and thermal barriers formed within a sealed hollow plunger body. In addition, a castable core metal was provided within the thermally determinate hollow plunger body, which could be varied to vary the thermal conductivity of such hollow body. Versatility, however, was materially limited in view of the fact that thermal insulators and conductors forming a part thereof predetermined the heat removal adjacent various areas, which could not be varied when production rates were changed.

In order to overcome the above-noted deficiencies in the pressing of glass items, the cooling system of the present invention has been developed, and accordingly, it is an object of the present invention to provide a method of an apparatus for cooling glass molding equipment which is independent of the mechanical considerations for forming the molding part. In addition, it is an object of the present invention to provide a cooling system which has the capability of accomodating a wide range of production speeds of up to about 1000% while utilizing the same molding equipment.

SUMMARY OF THE INVENTION

In its simplest form, the present invention sets forth a new concept in providing cooling for glass molding equipment by uncoupling the mechanical and thermal considerations required for efficient operation. For example, a plunger or mold can now be designed with a minimum wall thickness sufficient to withstand mechanical forces and deflection. The geometry of the mold or plunger can be very simple with nearly uniform thicknesses across their extent, thus materially simplifying fabrication and minimizing stress concentrations to thereby reduce maximum stresses. To insure the proper thermal performance of the plunger, a separate cooling block removably positionable within a hollow interior of the plunger, is designed with the proper shape and thermal conductivity to provide the cooling necessary for a desired production speed. However, should different production speeds be encountered, a differently designed cooling block would be inserted within the same mold or plunger. Since the cooling block can be made of material which can be easily machined, and since the various molds and plungers may be utilized with different cooling blocks, mold equipment cost can be significantly reduced.

BRIEF DESCRIPTION OF THE DRAWING

The FIGURE is an elevational view in section of a plunger incorporating the cooling system of the present invention.

PREFERRED EMBODIMENT OF THE INVENTION

Although the cooling system of the present invention may be utilized with virtually any glass molding equipment including plungers, molds and mold rings, for the sake of simplicity, the invention will be described in connection with a cooling system utilized with a plunger. Referring now to the drawing, a plunger assembly 10 is shown including a plunger body member 11 having a hollow interior or cavity 12 provided with a cooling insert block 14. The plunger member 11 is connected to a plunger head 16, such as by bolts 18. The plunger 11 has an operating nose portion 20 having an outer glass contacting surface 22 and an inner surface 24, forming a portion of the inner wall of cavity 12.

The cooling block 14 has a forward portion 26 with an outer surface 28 which is spaced-apart from the inner surface 24 with a predetermined distance, such as by means of an upper shoulder offset (not shown) or a spacer plug 30, so as to form a gap 32 between the forward portion 26 of the cooling insert 14 and the operating nose portion 20 of the plunger 11. The gap 32 is provided with a material 34 which is in a molten or liquid state at standard glass pressing temperatures, but which has a relatively high boiling point, such as soldering metals and other low melting alloys. Preferrably, an expansion area 36 is provided within the gap 32 above the alloy 34 to accomodate the expansion of the alloy during the glass pressing operations.

The cooling insert block 14 is provided with an inner hollow portion 38 which may include cooling passages 40. A suitable coolant, such as water, is applied to the hollow portion 38 of the cooling block 14 by means of a coolant inlet passage 42, formed in the plunger head 16, and a distributor deflector 44, associated with the hollow portion 38 for distributing the coolant within the insert 14. An outlet passage 46, formed in the plunger head 16, communicates with the hollow interior portion 38 of the cooling block 14 for facilitating the removal of the cooling fluid from the insert 14 while preventing such fluid from directly contacting plunger 11. A suitable sealing ring 48 may be provided between the insert block 14 the plunger member 11 to prevent the coolant from entering the gap 32.

Although the cooling insert 14 is shown as a rather massive block with cooling passages 40 supplementing the heat extraction from the plunger in selected areas, it is understood that the cooling insert could also take the form of a rather thin shell-like member, depending upon the particular thermal considerations necessary for the selected forming operation. That is, the thickness of the insert not only depends upon the thermal conductivity of the material utilized, but also the intended production speed. For a given thermal conductivity, at higher production speeds the plunger tends to run hotter due to extended contact with the molten glass, and accordingly a thinner walled shell-like cooling insert would be desirable since it would provide a steeper temperature gradient between the glass contacting surface 22 and the cooling surface of the hollow portion 38, to thereby facilitate faster cooling of the plunger. However, when utilizing a relatively thin walled cooler insert, in order to moderate the severity of the cooling supplied by the cooling water and provide a more uniform cooling distribution, a material having a moderate thermal conductivity such as stainless steel, would be preferred over one having a relatively high thermal conductivity such as aluminum.

In contrast, however, when lower production speeds are utilized, the plunger glass contacting time is materially reduced and accordingly the amount of heat which the plunger extracts from the glass is reduced. Therefore, if the amount of cooling, normally utilized with standard operating production speeds were not minimized, the plunger would become overcooled and result in checks or cracking of the glass articles. Thus, in order to provide a more shallow temperature gradient between the hot glass contacting surface of the plunger and the cooling surface of the hollow portion of the insert, a thicker insert block, such as shown in the figure, is desirable. That is, since less heat is absorbed by the plunger when it is operated at slower production speeds, the temperature gradient between the glass contact surface and the hollow cooling portion is reduced, and in order to prevent overcooling of the plunger, a thicker block-like cooling insert is utilized. Accordingly, although the surface of the hollow portion would be close to that of the cooling fluid, the thicker insert block provides a more shallow gradient to facilitate a desired uniform cooling of the plunger without resulting in overcooling. When utilizing such cooling insert blocks, a high conductivity material such as aluminum is usually preferred since it facilitates the rate of heat removal in a uniform manner. As previously mentioned, the appropriate thickness of the cooling insert block to be utilized depends upon the desired speed of operation and the thermal conductivity of the cooler insert.

The gap 32 between the inner surface 24 of the plunger 11 and the outer surface 28 of the insert 14 is preferably of a minimum uniform thickness for effecting good heat transfer through the molten solder between the plunger and the cooling block. If the gap were not present and no molten alloy were utilized, the heat transfer between the cooling block and the plunger would merely be by a face-to-face metal-to-metal contact, which would provide inconsistent and non-uniform heat transfer between the surfaces. Thus, the utilization of the low melting alloy wets both the outer surface 28 of the cooling block 14 and the back or inner surface 24 of the plunger 11 to insure good heat transfer between such surfaces. By having a uniform gap, a uniform heat transfer is accordingly provided between the insert and the plunger. Further, by utilizing a small gap, such as not exceeding about one-quarter inch, the liquid solder within the gap, while functioning to provide good heat transfer between the plunger and the cooling block, does not materially effect the total cooling system. In addition, the smaller gap reduces the amount of molten solder necessary to provide the heat transfer and accordingly minimizes the amount of expansion and the need for expansion area 36. Various solders or low melting alloys may be utilized which are compatible with the plunger and expansion block, such as an alloy of 55.5% bismuth and 44.5% lead. Such solders may melt anywhere in the range of from about 150° F. to about 250° F.

It thus can be seen that the mechanical design of the plunger and the thermal design of the cooling insert block can be uncoupled so that various insert blocks may be utilized with the same plunger, depending upon the desired production speeds to be utilized. That is, in the conventional plungers of the prior art, the plunger design and the internal water cooling where intimately connected, with the plunger thickness at various portions being determined by the speed of production and the temperature distribution on the face of the plunger. When the production speed was changed, there was little that could be done to compensate for the different heat input to the plunger, and accordingly either sticking occurred when higher production speeds were utilized, or checks and cracking occurred when lower production speeds were utilized. With the present invention, however, the desired temperature profile to be produced at the plunger face can be controlled with the different cooler inserts having desired geometries to produce the correct temperature profile. Further, the plunger can now be designed with minimum uniform thicknesses to merely withstand mechanical forces and deflection. In addition, the cooling block may be easily machined and designed in proper shape to provide the cooling to the plunger. Accordingly, since the cooling block can be reused with different plungers, mold equipment costs can be significantly reduced. As previously mentioned, although the invention has been disclosed with particular reference to a plunger, the invention is equally applicable to cooling systems for molds, mold rings and the like.

Although we have disclosed the now preferred embodiments of our invention, it will be understood that various changes and modification may be made thereto without departing from the spirit and scope of the appended claims.

We claim:

1. A glass molding assembly for molding glass articles having an improved cooling system for accomodating various heat removal rates necessitated by differing production speeds which comprises:
   a molding body member having a solid portion with a glass-contacting surface on one side and an inner surface on the opposite side forming a hollow interior cavity;
   a cooling insert member removably positioned within said hollow interior cavity of said body member, said cooling insert having an outer surface portion and a hollow portion;
   means for supplying cooling fluid to and distributing such fluid within said hollow portion of said cooling insert while prohibiting such cooling fluid from contacting said molding body member;
   a low melting metal material, which is molten at glass forming temperatures, provided in said hollow interior cavity between, and in intimate contact with, the inner surface of said body member and the outer surface portion of said cooling insert member to provide good thermal conductivity therebetween; and
   means for substituting different cooling inserts within said molding body member to facilitate different rates of cooling required by varying production speeds; and said cooling insert member having a predetermined thermal conductivity and thickness predicated upon the proposed production speed of said molding body member, and said means for supplying cooling fluid also including means for directly cooling said cooling insert member by direct contact with said cooling fluid while preventing direct contact of said cooling fluid with said molding body member, and for cooling said body member by extracting heat therefrom through the molten metal material to the cooled insert member.

2. A glass molding assembly as defined in claim 1 including means for forming a uniform gap between said molding body member and said cooling insert member, and said low melting metal material filling a substantial portion of said gap for providing good thermal conductivity between said body member and said cooling member.

3. A glass molding assembly as defined in claim 1 including means for spacing said outer surface portion of said cooling member a uniform predetermined distance from said inner surface of said molding body member to provide a uniform gap therebetween, and said gap being substantially filled with said low melting metal material, in the form of a low melting alloy, which wets both said inner surface and said outer surface to provide the desired thermal conductivity therebetween.

4. A glass molding assembly as defined in claim 1 wherein said means for supplying cooling fluid to said hollow portion of said insert member includes means for circulating the cooling fluid solely within said cooling insert member and discharging said circulated fluid therefrom while preventing any of such fluid from impinging on and contacting said molding body member.

5. A glass molding assembly as defined in claim 1 wherein said cooling insert member is removable from said molding body member and additional cooling insert members having various cooling properties for cooling the molding body member at different production speeds, are insertable within said hollow interior cavity so as to uncouple the thermal considerations from the mechanical considerations of the molding assembly.

6. A glass molding assembly as defined in claim 1 wherein said cooling insert is in the form of a block of high thermal conductivity material having selected cooling passages formed therein, and the outer surface of said cooling insert being in direct contact with and wetted by said molten metal material within said gap.

7. A glass molding assembly as defined in claim 1 wherein said molten metal material comprises a low melting metal alloy which is molten at standard glass forming temperatures.

* * * * *